(12) United States Patent
Mieville et al.

(10) Patent No.: US 9,482,828 B2
(45) Date of Patent: Nov. 1, 2016

(54) ONE-PIECE ALIGNMENT SOCKET HOLDER WITH LOCKING MEANS

(71) Applicant: FISCHER CONNECTORS HOLDINGS S.A., St-Prex (CH)

(72) Inventors: Jacques Mieville, Morrens (CH); Olivier Testaz, Mont-sur-Lausanne (CH)

(73) Assignee: Fischer Connectors Holding S.A., Saint-Prex (CH)

( * ) Notice: Subject to any disclaimer, the term of this patent is extended or adjusted under 35 U.S.C. 154(b) by 0 days.

(21) Appl. No.: 14/424,322

(22) PCT Filed: Aug. 23, 2013

(86) PCT No.: PCT/IB2013/056831
§ 371 (c)(1),
(2) Date: Feb. 26, 2015

(87) PCT Pub. No.: WO2014/041449
PCT Pub. Date: Mar. 20, 2014

(65) Prior Publication Data
US 2015/0241643 A1    Aug. 27, 2015

(30) Foreign Application Priority Data

Sep. 12, 2012  (CH) ..................... 1658/12

(51) Int. Cl.
*G02B 6/38*    (2006.01)
(52) U.S. Cl.
CPC ............. *G02B 6/3893* (2013.01); *G02B 6/387* (2013.01); *G02B 6/3874* (2013.01); *G02B 6/3878* (2013.01); *G02B 6/3891* (2013.01); *G02B 6/3898* (2013.01)
(58) Field of Classification Search
CPC .................................................... G02B 6/3891
See application file for complete search history.

(56) References Cited

U.S. PATENT DOCUMENTS

| | | | | |
|---|---|---|---|---|
| 3,951,514 A | * | 4/1976 | Medina, Jr. ............. | B25B 27/14 29/758 |
| 4,140,367 A | * | 2/1979 | Makuch ................. | G02B 6/406 385/54 |
| 4,146,288 A | * | 3/1979 | Ramsay ............... | H01R 13/625 285/2 |
| 4,182,546 A | * | 1/1980 | Lukas .................. | G02B 6/3809 385/55 |
| 4,820,185 A | * | 4/1989 | Moulin ................ | H01R 13/621 385/59 |
| 5,265,182 A | * | 11/1993 | Hartley ................ | G02B 6/3874 385/55 |
| 5,366,315 A | * | 11/1994 | Hartley ................ | G02B 6/3874 403/20 |
| 5,386,486 A | * | 1/1995 | Fan ...................... | G02B 6/3807 385/59 |

(Continued)

FOREIGN PATENT DOCUMENTS

EP    0 462 362    12/1991

OTHER PUBLICATIONS

International Search Report for PCT/IB2013/056831, mailed Feb. 19, 2014, 4 pages.

(Continued)

*Primary Examiner* — Rhonda Peace
(74) *Attorney, Agent, or Firm* — Nixon & Vanderhye P.C.

(57) ABSTRACT

The invention relates to an alignment socket supporting system for connectors, such as optical connectors, comprising: the assembly of parts, allowing more than one alignment socket to be secured in a pre-determined manner and the extraction and insertion of all of the alignment sockets simultaneously without dismantling the assembly, and locking means for locking the system once inserted.

17 Claims, 12 Drawing Sheets

(56) References Cited

U.S. PATENT DOCUMENTS

| | | | | |
|---|---|---|---|---|
| 5,751,874 A * | 5/1998 | Chudoba | G02B 6/266 | 385/139 |
| 5,757,996 A * | 5/1998 | Vine | G02B 6/3878 | 385/59 |
| 5,870,515 A * | 2/1999 | Ott | G02B 6/3825 | 385/134 |
| 6,095,694 A * | 8/2000 | Chudoba | G02B 6/3825 | 385/62 |
| 6,357,929 B1 | 3/2002 | Roehrs et al. | | |
| 6,398,423 B1 * | 6/2002 | Novacoski | G02B 6/3851 | 385/53 |
| 6,443,626 B1 * | 9/2002 | Foster | G02B 6/3816 | 385/56 |
| 6,886,951 B2 * | 5/2005 | Bennett | G02B 26/0825 | 310/328 |
| 7,090,406 B2 * | 8/2006 | Melton | G02B 6/3869 | 385/147 |
| 7,156,560 B2 * | 1/2007 | Seeley | G02B 6/3831 | 385/59 |
| 7,318,677 B2 * | 1/2008 | Dye | G02B 6/3821 | 385/53 |
| 8,403,570 B2 * | 3/2013 | Fisher | G02B 6/3878 | 385/70 |
| 8,944,697 B2 * | 2/2015 | Youngkin | G02B 6/3869 | 385/59 |
| 9,304,263 B2 * | 4/2016 | Youngkin | G02B 6/3869 | |
| 2004/0223720 A1 | 11/2004 | Melton et al. | | |
| 2008/0089650 A1 * | 4/2008 | Legler | G02B 6/389 | 385/59 |
| 2015/0241643 A1 * | 8/2015 | Mieville | G02B 6/3878 | 385/59 |

OTHER PUBLICATIONS

Written Opinion of the International Searching Authority for PCT/IB2013/056831 (non-English), mailed Feb. 19, 2014, 5 pages.

* cited by examiner

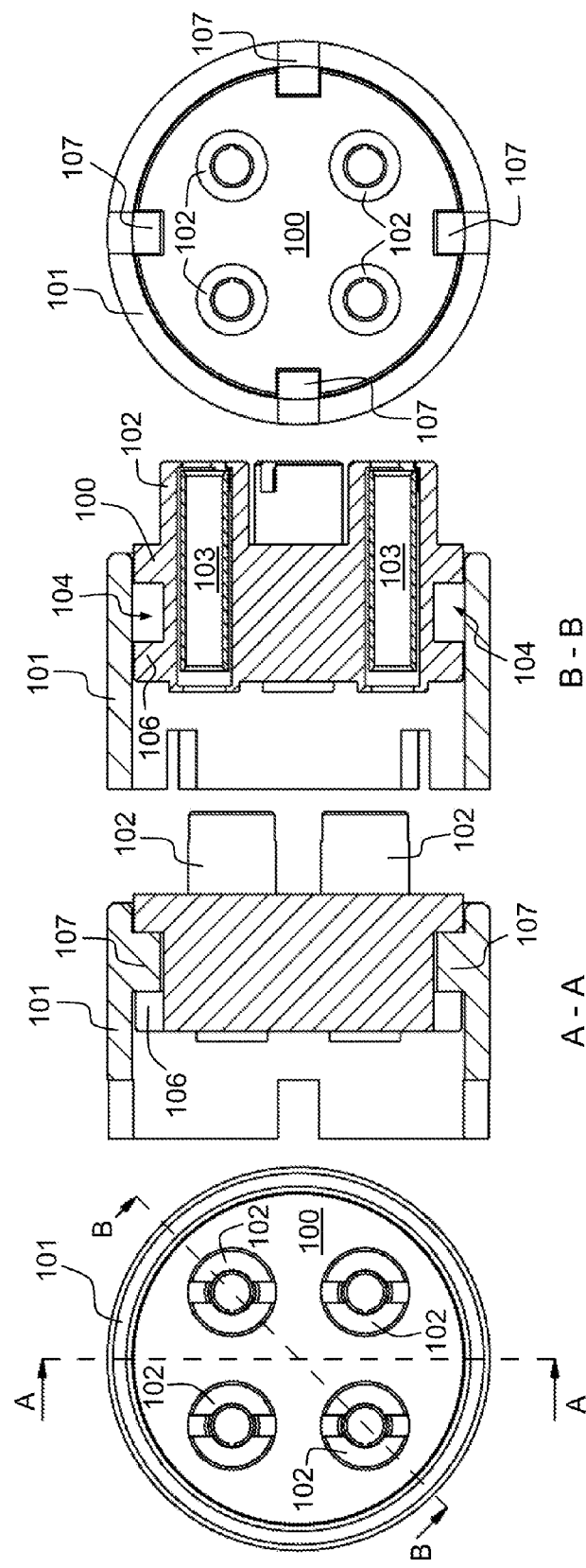

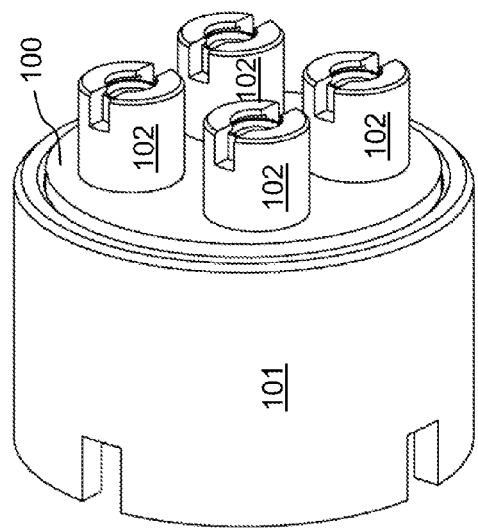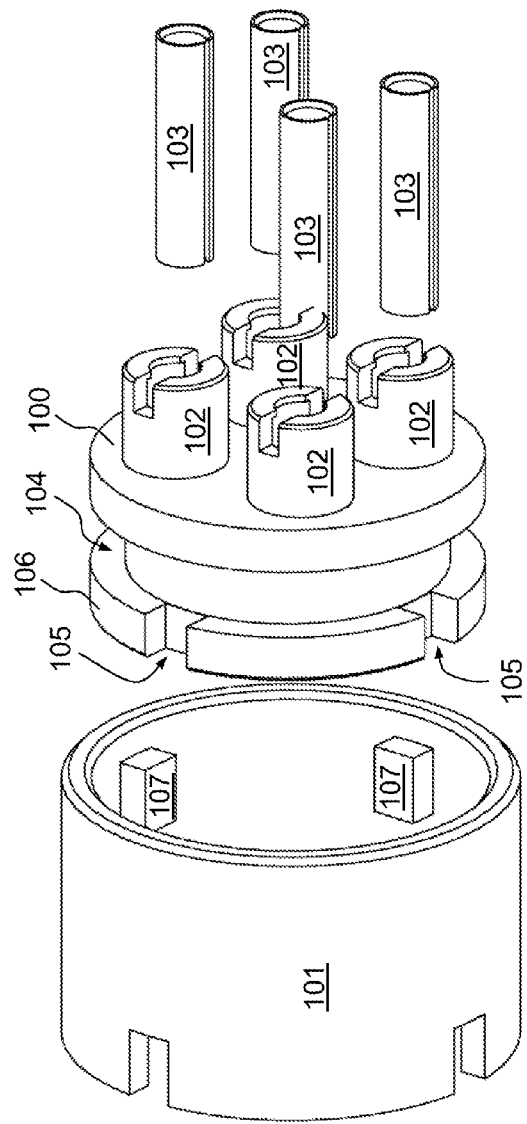
FIG.4E
FIG.4F

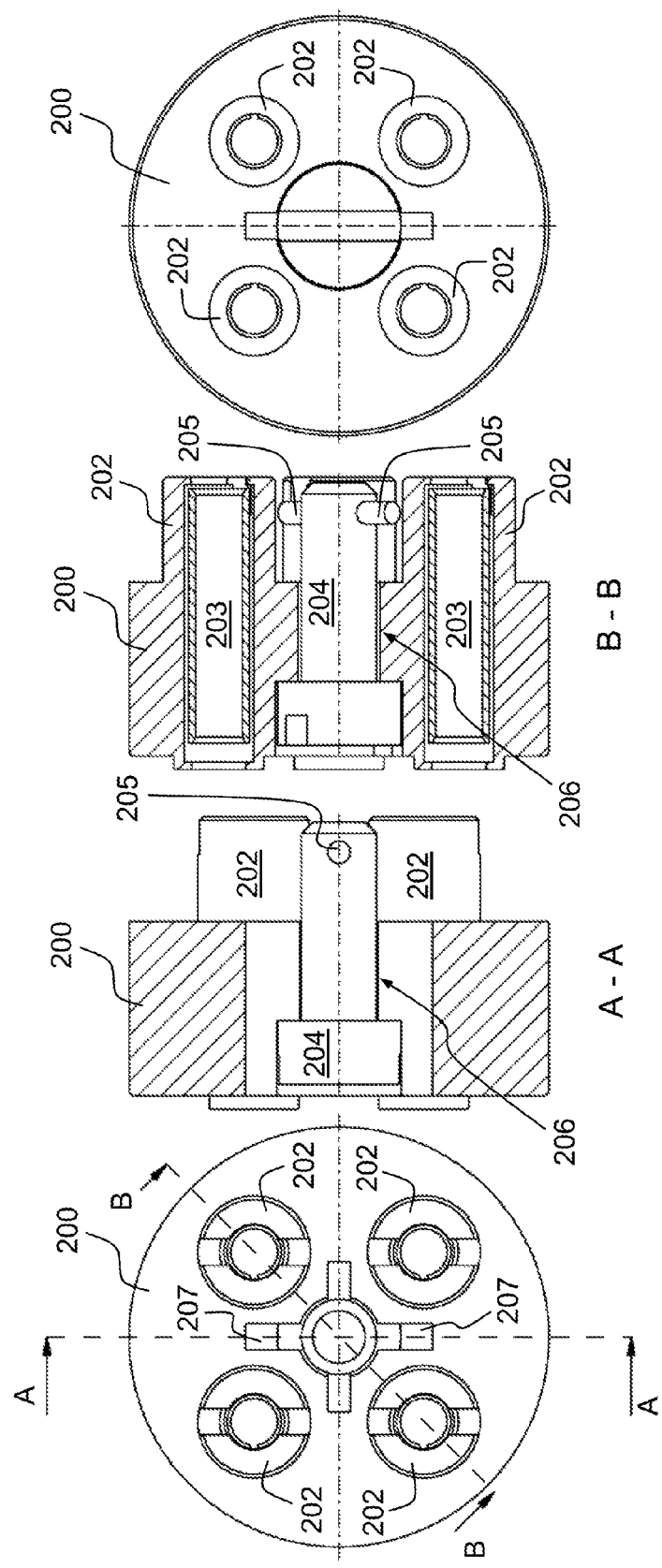

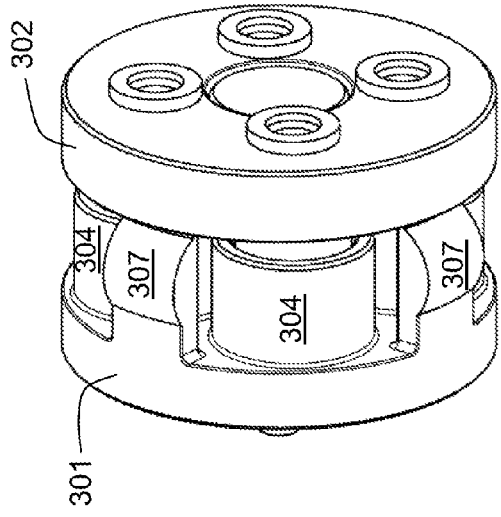
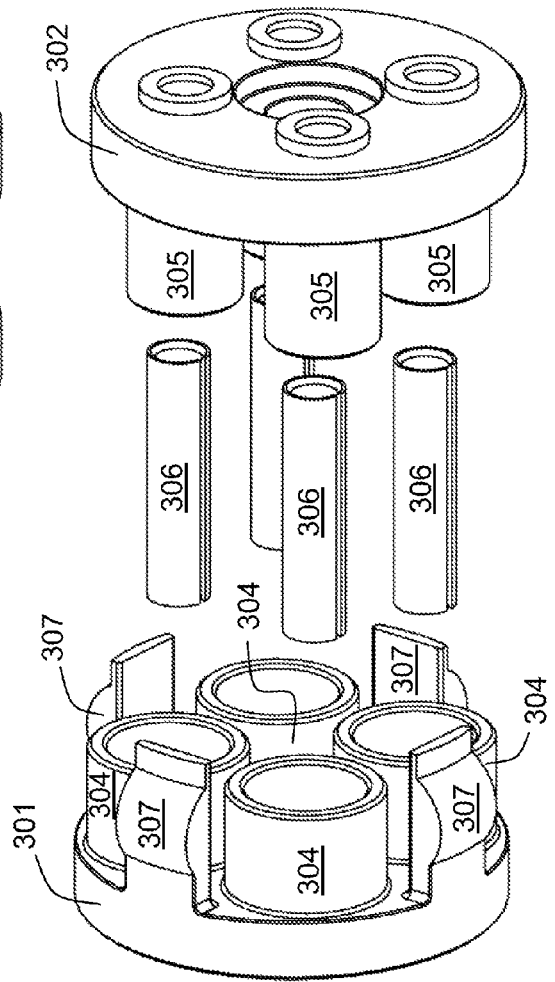
FIG.6D
FIG.6E

ONE-PIECE ALIGNMENT SOCKET HOLDER WITH LOCKING MEANS

This application is the U.S. national phase of International Application No. PCT/IB2013/056831, filed 23 Aug. 2013, which designated the U.S. and claims priority to CH 1658/12, filed 12 Sep. 2012, the entire contents of each of which are hereby incorporated by reference.

TECHNICAL FIELD AND PRIOR ART

The present invention relates to the field of connectors, notably optical connectors.

More precisely, the present invention relates to alignment sockets used in the contacts of these connectors.

A typical example of a contact/connector of this kind is given in U.S. Pat. No. 6,357,929.

Other examples of these contacts/connectors are marketed by the Glenair® and Souriau® corporations, and are described in the web pages at the following addresses:
http://www.glenair.com/contacts/pdf/fiber optic 181 043.pdf
http://www.glenair.com/contacts/pdf/fiber optic 181 050.pdf
http://www.glenair.com/contacts/qpl_and_commercial-_high_performance_fiber_optic_termini.htm
http://www.souriau.com/fileadmin/Souriau/product_pdf/ELIO-Fiber-Optic-Contact.pdf Commonly used elements in these contacts are alignment sockets which allow the ferrules to be aligned precisely when the connector is connected. This precise alignment is necessary to ensure correct transmission of the information, for example optical information in the case of optical fiber connectors.

In addition to individual socket mounting systems, there are systems available in the field of optical fiber connections for securing alignment sockets, which are fixed to one of the contact blocks or are secured individually by screwing to the ferrules.

Only Hirose offers, in its HE2 series of connectors, the possibility of removing the protection which holds the alignment sockets in a one-piece arrangement (with the aid of a screw).

In this system, however, the alignment sockets remain on the ferrules when the protection has been removed. In fact, accessing said ferrules (in the Hirose connector) requires a second operation, using a special tool for withdrawing the sockets one by one.

This operation is inconvenient, notably if there is a large number of sockets and/or if the sockets are small. Moreover, it should be possible to carry out this dismounting in a simple way for the purpose of cleaning or changing said sockets.

A connector made by the Glenair® corporation, marketed under the name of "Glenair Next Generation (NGCON) Fiber Optic Connection System", apparently includes a socket holder which is attached to the connector by a screw.

BRIEF DESCRIPTION OF THE INVENTION

One object of the invention is, therefore, to improve the known contacts and connectors.

More precisely, one object of the invention is to propose a contact, for example a contact for an optical connector, having simple and effective means for dismounting the alignment sockets and accessing the ferrules, in order to clean the ferrules for example.

The desire to provide easier access to the ferrules of the two components (the plug and the base socket) has resulted, in one embodiment of the invention, in a one-piece alignment socket holder which is easily dismounted in a single operation without the use of an additional part as proposed in the Glenair® product described above. Thus all the sockets are withdrawn at the same time while still remaining aligned, which facilitates their (re)mounting, also in a single operation.

The socket holder according to the invention is simple and inexpensive, and can therefore be exchanged if necessary.

One of the ideas behind the present invention is that of designing parts for the formation of a block incorporating the alignment sockets; this block may be mounted in a connector or withdrawn by means of a locking system integrated in said block.

This locking allows very simple insertion and withdrawal of the alignment sockets.

In a preferred embodiment, a locking system of the push-pull type is integrated into the alignment socket holder according to the invention to ensure that it cannot be removed in an uncontrolled way, for example during disconnection.

In one embodiment, the system comprises an assembly of three parts which allows, on the one hand, the securing of more than one alignment socket in a predetermined manner and, on the other hand, the simultaneous extraction and insertion of all the alignment sockets in a connector without the dismounting of said assembly.

In one embodiment, the assembly is of the push-pull type, allowing the mounting and dismounting of an alignment socket while allowing the position of said socket to be maintained during the plugging-in and unplugging of the complete connector.

Preferably, the number of ferrule alignment sockets is greater than one.

In one embodiment, the assembly is of the clipper type.

In another embodiment, the assembly is of the bayonet type.

BRIEF DESCRIPTION OF THE DRAWINGS

The invention will be more readily understood from the description of a number of embodiments and the figures relating thereto, in which:

FIGS. 4A to 4F show views of another embodiment of the socket holder according to the invention;

FIGS. 5A to 5F show views of another embodiment of the socket holder according to the invention;

FIGS. 6A to 6E show views of another embodiment of the socket holder according to the invention;

DETAILED DESCRIPTION

The invention will now be described with reference to the figures which show a number of embodiments of the present invention.

Figure 1:
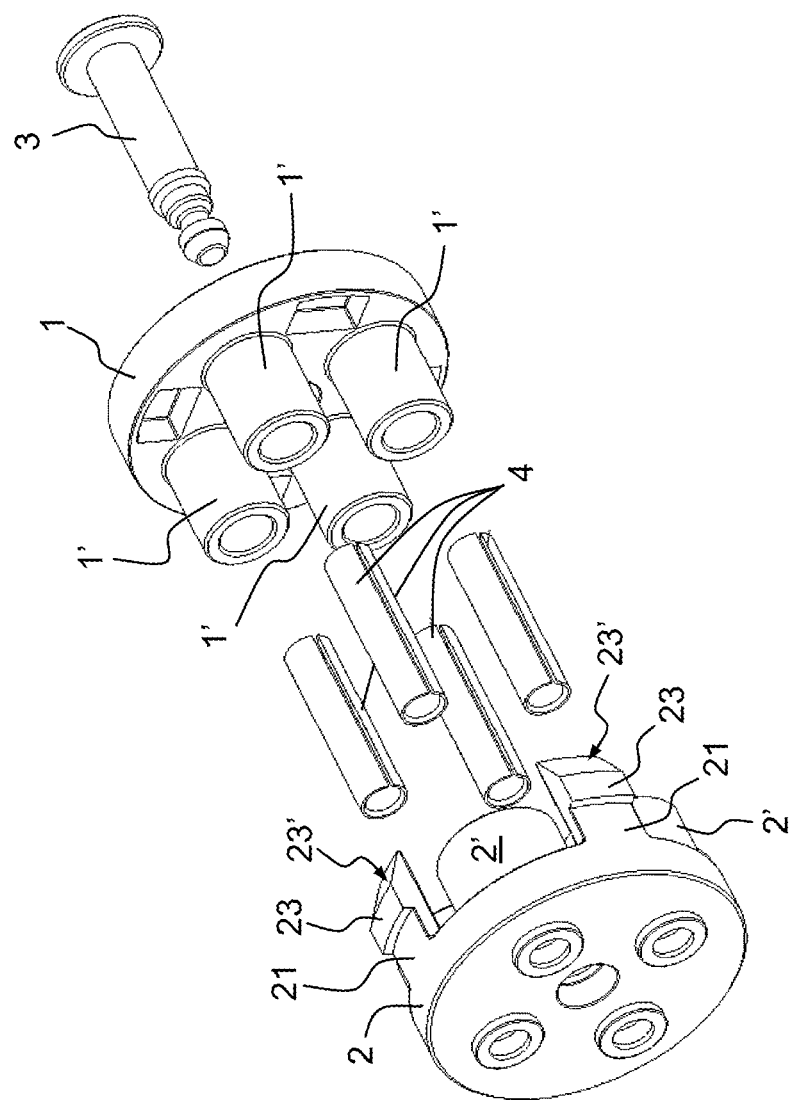
FIG. 1 shows an exploded perspective view of an embodiment of the socket holder according to the invention.

A first embodiment of the invention shown in FIG. 1 comprises a first part 1 forming a male socket holder, a second part 2 forming a female socket holder, a third part 3 forming a locking pin, and alignment sockets 4 (typically available on the market) which fit into parts 1 and 2, for example into carriers or retainers 1', 2'.

In this embodiment, four sockets are shown, but it would be feasible to have variants with fewer than four sockets or more than four sockets while following the principle of the present invention.

The assembly of these parts 1-4 produces a sub-unit called a one-piece push-pull alignment socket holder according to the present invention.

Figure 2:
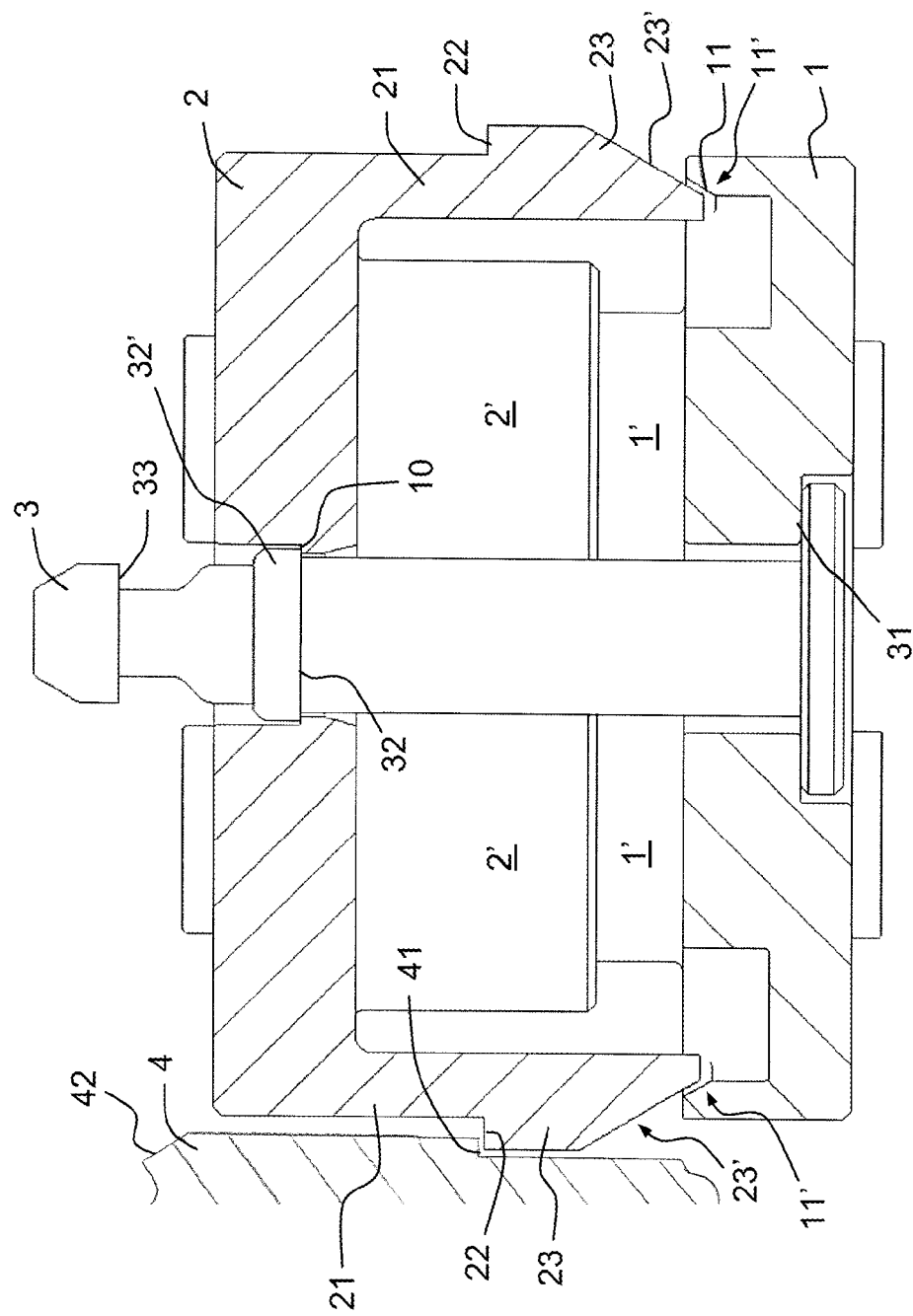
FIG. 2 shows a view in axial section of an embodiment of the socket holder according to the invention in a first position.
Figure 3:
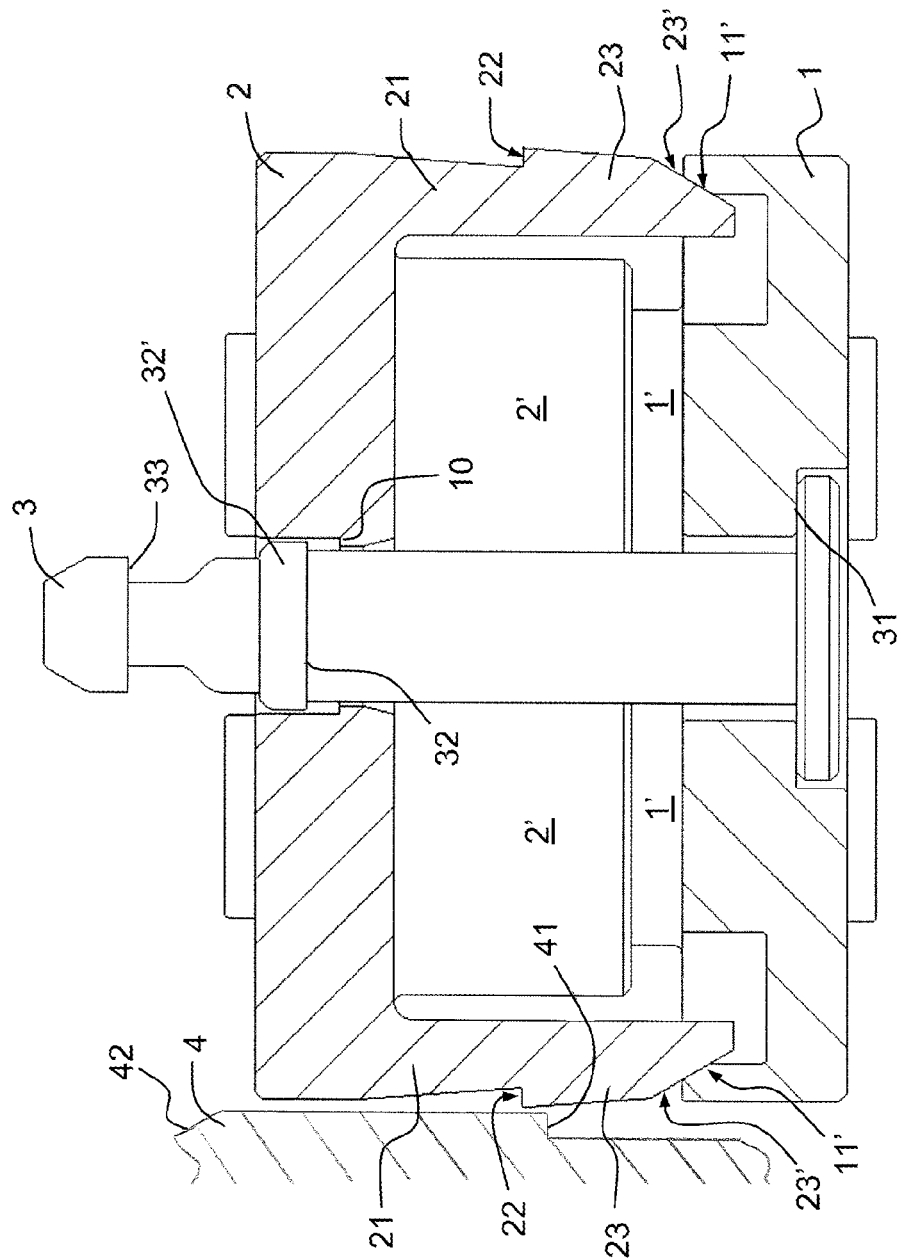
FIG. 3 shows a view in axial section of an embodiment of the socket holder according to the invention in a second position.

To ensure that the socket holder system does not become dismounted after its assembly, the pin 3 comprises a collar 32' with a shoulder 32 which prevents the female part 2 from becoming dismounted, for example by means of a corresponding ledge 10 located in the passage hole of the pin 3 (see FIGS. 2 and 3).

Reference will now be made to FIGS. 2 and 3, which show the device of FIG. 1 in the mounted state, in two different positions.

According to the invention, a "push-pull" locking function is provided by resilient tabs 21 which, in the unstressed basic position, form a shoulder 22 allowing engagement with a configuration 41 (a corresponding shoulder, for example) formed on the counter-part 4 (for example, belonging to the contact or to the connector in which the system is mounted).

The operation of these push-pull modes is described in greater detail below.

The Push Function

For locking the system (the push function), a pressure must be exerted on the second part 2 so that it can be inserted into the configuration as a result of the flexing of the strips 21 whose displacement is caused by the friction of the chamfer 23 at the end of the strip 21 against the entry area 42 of the configuration 4. When fitted in position, the system is locked by the action of the strips 21 which are raised again in the configuration 4 at the position of the shoulder 41. Retention in position is ensured by the fact that there is no possible angle allowing the flexion of the strips 21 between the shoulder of the configuration 41 and the shoulder 22 of the female alignment socket holder 2.

This position is shown in FIG. 2, where the socket holder is locked in the entry area 42, which belongs to a connector, for example.

To ensure that the socket holder system does not become dismounted after its assembly, the pin 3 comprises a collar 32' with a shoulder 32 which prevents the female part 2 from becoming dismounted, for example by means of a corresponding ledge 10 located in the passage hole of the pin 3.

The Pull Function

For unlocking the system (the pull function), the strips 21 must be displaced toward the pin 3 in order to terminate the engagement of their shoulder 22 against the configuration 41. For this purpose, provision is made to exert a mechanical pulling action on the locking pin 3 forming the actuating means. The force generated by this pulling action is transmitted to the male socket holder 1, which is displaced axially against the female socket holder 2 by the action of said pulling force.

To facilitate the application of this pulling force, the pin 3 may have a mushroom-shaped head with a shoulder 33 which can be gripped, for example by means of a tool such as a pair of pliers.

During this displacement, the chamfers 11 of the male part 1 come into contact with the ends of the strips 23 and exert a stress on said strips toward the inside of the one-piece alignment socket holder, that is to say toward the pin 3, by means of the inclined plane 11' of the chamfer 11 which interacts with the inclined plane 23' of the end 23 of the strip 21.

This stress enables the strips 23 to be displaced toward said stress, that is to say toward the pin 3, thus allowing the shoulder 22 to pass under the configuration 41 which retains it as a result of the contraction of the strips 21 caused in this way, thus allowing the one-piece alignment socket holder to be extracted by a single operation of pulling on the pin.

In this way, a system is obtained which is very easy to manipulate, and the dismounting and remounting of all the sockets is carried out in a very rapid and simple manner.

The parts 1 and 2 are preferably made of synthetic materials (plastics or the like).

FIGS. 4A to 4F show an embodiment in which the push-pull securing system is replaced by a bayonet system.

More precisely, FIG. 4A is a rear view of the support 100, FIG. 4B is a sectional view taken along the axis A-A, FIG. 4C is a sectional view taken along the axis B-B, FIG. 4D is a front view of the support 100, FIG. 4E is a perspective view of the support 100 in the mounted state, and FIG. 4F is an exploded perspective view of the support 100.

More precisely, the support 100 is mounted in a ring 101 forming part of the connector (not shown) and attached by means which are described below. The support 100 comprises, notably, retainers 102 in which the sockets 103 are located. Said sockets 103 may, for example, be forced into the retainers 102, or the support 100 may be made in two parts as in the first embodiment, to allow the sockets 103 to be mounted in the retainers 102.

To enable the support 100 to be secured in the ring 101, a bayonet system is provided, this system being constructed as described below. The support comprises a groove 104 (a part with a reduced diameter) and passages 105 on the rear diameter 106 of the support 100. These passages 105 are intended to interact with projecting elements 107 which are located in the ring 101 at the time of mounting to enable the support 100 to be locked in the ring by an effect of the bayonet type: when the support 100 is mounted, it undergoes a rotation, and the elements 107 are then locked in the groove 104, resulting in the connection of the parts 100 and 101 by a simple rotation. It is possible, for example, to provide a stop system (not shown) to limit the relative rotation of the support 100 and the ring 101.

When the support 100 has been mounted in the ring and rotated with respect to it by 45°, for example, it is no longer possible to extract the support 100 axially from the ring 101, and axial locking is thus provided.

Figure 5E:
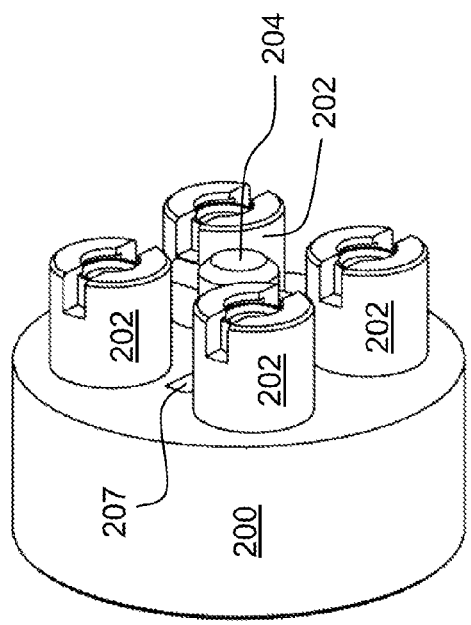
Figure 5F:
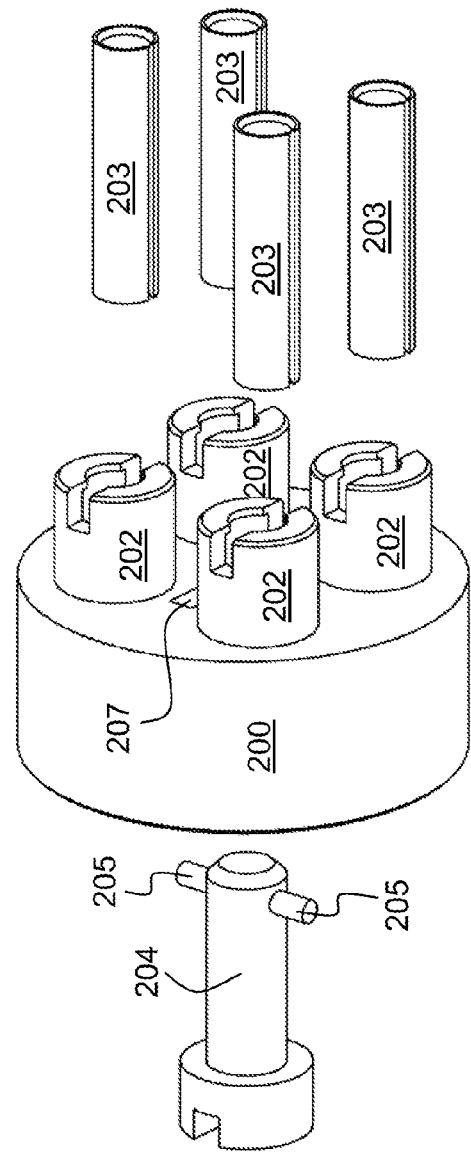

FIGS. 5A to 5F show another bayonet-type locking system using a central pin with carriers. More precisely, FIG. 5A is a rear view of the support 200, FIG. 5B is a sectional view taken along the axis A-A, FIG. 5C is a sectional view taken along the axis B-B, FIG. 5D is a front view of the support 200, FIG. 5E is a perspective view of the support 200 in the mounted state, and FIG. 5F is an exploded perspective view of the support 200.

The support 200 comprises, notably, retainers 202 in which the sockets 203 are located. Said sockets 203 may, for example, be forced into the retainers 202, or the support 200 may be made in two parts as in the first embodiment, to allow the sockets 203 to be mounted in the retainers 202.

In this mode, the bayonet-type locking means used is a pin 204 having carriers 205 extending perpendicularly to the axis of the pin (see FIG. 5F, notably). When the support 200 has been mounted, the pin is introduced into an axial hole 206 in the support 200, this hole having grooves 207 corresponding to the carriers 205 to allow this introduction, and the pin 204 and its carriers 205 are then used to lock the mounting of the support 200 in the connector (not shown) by corresponding suitable means, for example transverse grooves receiving the carriers 205.

Preferably, in the bayonet embodiments, resilient means of the spring type, for example (not shown), are used to ensure that the connector can withstand vibrations and that the system will not become dismounted in an untimely manner during use. Any equivalent means of achieving this result may be used.

FIGS. 6A-6E and 7A-7D show embodiments using a clipping system for mounting the support in the connector.

Figure 6C:
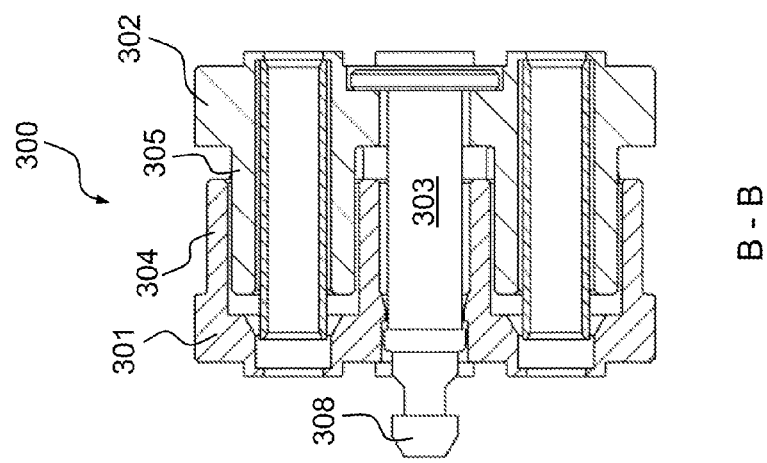
Figure 6B:
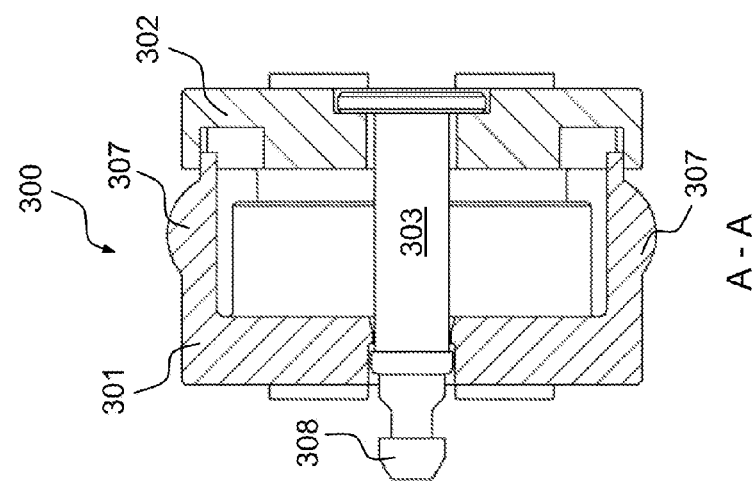
Figure 6A:
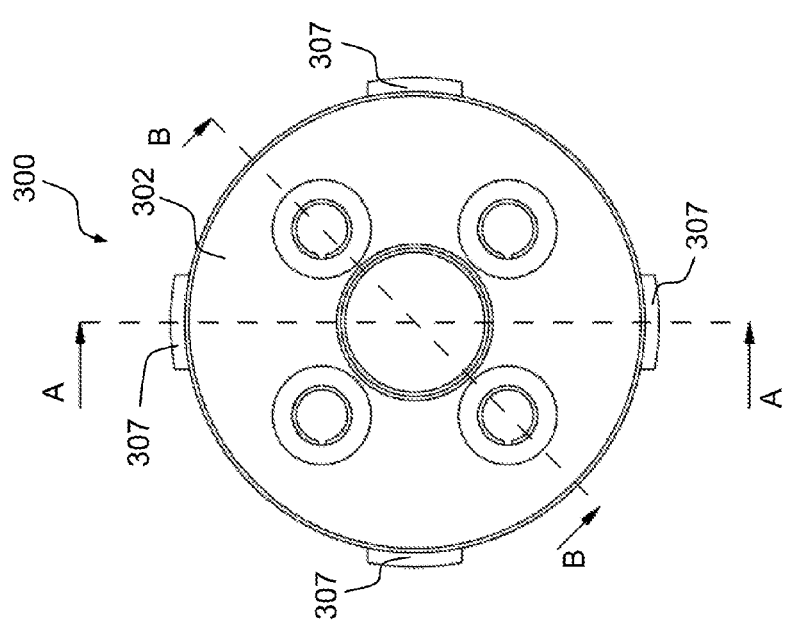

More precisely, FIG. 6A is a rear view of the support 300, FIG. 6B is a sectional view taken along the axis A-A, FIG. 6C is a sectional view taken along the axis B-B, FIG. 6D is a perspective view of the support 300 in the mounted state, and FIG. 6E is an exploded perspective view of the support 300.

The support 300 comprises a first part 301, a second part 302 and a pin 303. The two parts 301-302 are fitted into one another by means of half-retainers 304, 305 to form retainers in which the sockets 306 are located. It should be noted that the two-part system shown here may be applied in a corresponding manner to the embodiments of FIGS. 4A-4F, 5A-5F.

Additionally, the first part includes a plurality of bosses 307 (for example, four bosses distributed over the circumference of the support) enabling the support 300 to be clipped into the connector (into corresponding housings of the connector) for its mounting and axial locking according to the principles of the present invention. In this embodiment, the pin 303 serves to facilitate the extraction of the mounted support, for example by pulling on its proximal end 308 by means of an appropriate tool (as in the first "push-pull" embodiment described above). A "push-pull" action may or may not be added, using inclined planes at the sides of the bosses 307 and on the inside of the part 302, if desired.

Clearly, the number of bosses is not limited to four, and their positions may be other than those shown by way of example.

Figure 7C:
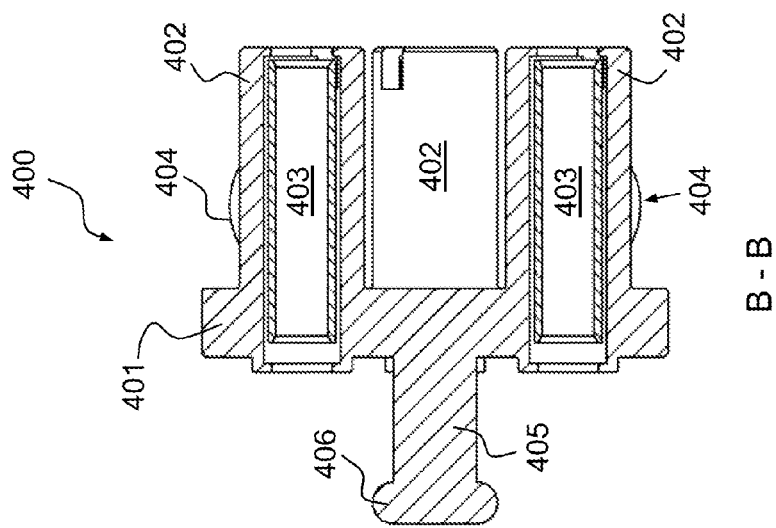
FIGS. 7A to 7E show views of another embodiment of the socket holder according to the invention.
Figure 7B:
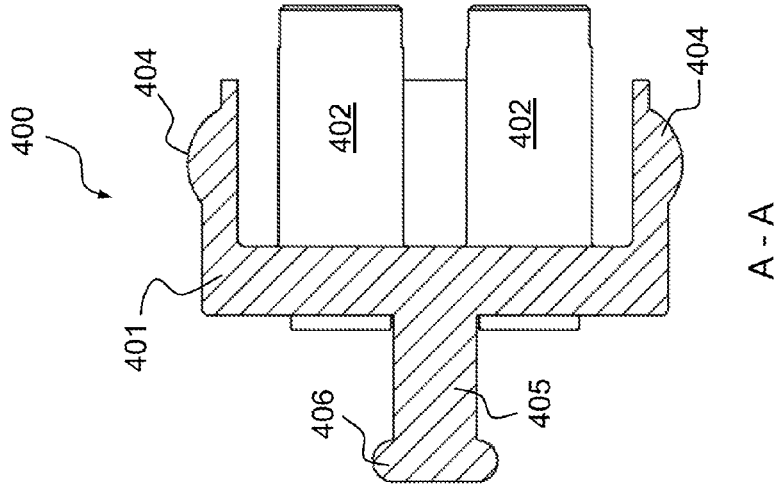
Figure 7A:
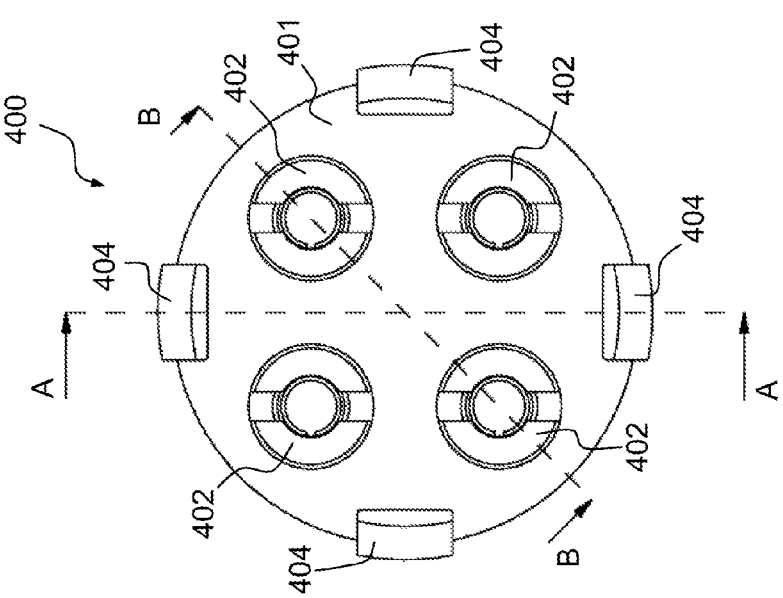
Figure 7D:
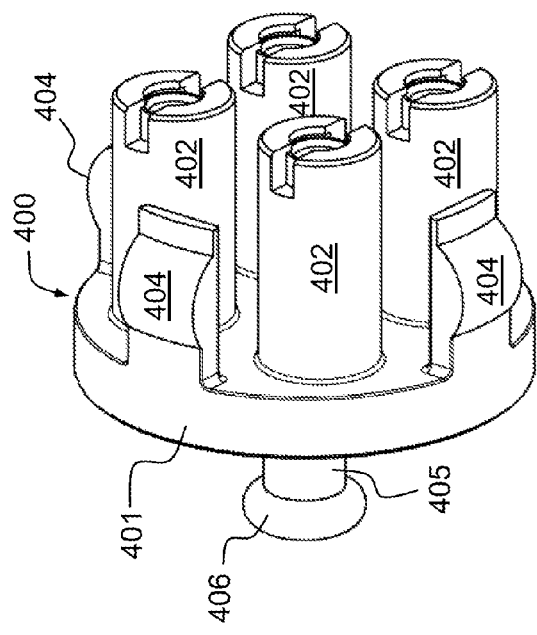
Figure 7E:
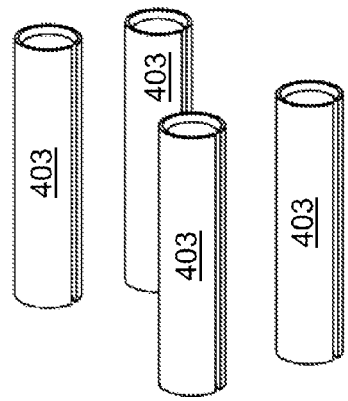
Figure 7E:
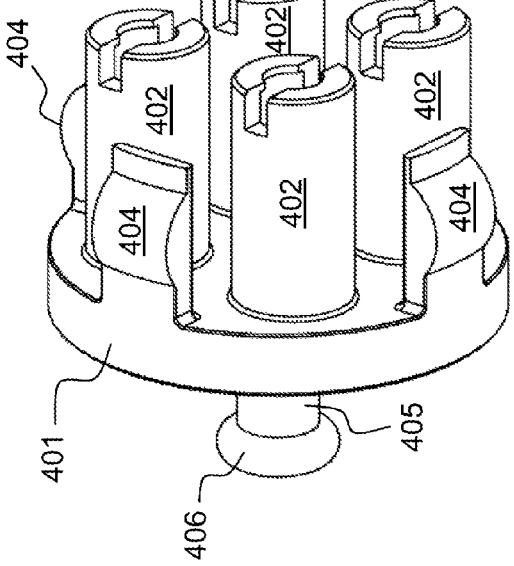

FIGS. 7A-7E show an embodiment derived from that of FIGS. 6A-6E. More precisely, FIG. 7A is a rear view of the support 400, FIG. 7B is a sectional view taken along the axis A-A, FIG. 7C is a sectional view taken along the axis B-B, FIG. 7D is a perspective view of the support 400 in the mounted state, and FIG. 7E is an exploded perspective view of the support 400.

This support 400 comprises only one part 401 (in place of the two parts 301-302 of the preceding embodiment), and the pin 405 corresponds to the pin 303, but is integrated in the part 401, with a function equivalent to that of the pin 303 for the extraction of the support (see above).

The support 401 comprises retainers 402 (four in number, for example) in which the sockets 403 are located according to the principles disclosed above in relation to the other embodiments. The part 401 comprises a plurality of bosses 404 (four in number, for example) for clipping the part onto the connector (into corresponding housings, for example) in order to lock the support in the connector. To extract the support 401, the proximal end 406 of the pin 405 can be pulled on as disclosed above, by using an appropriate tool, for example.

Figure 8:
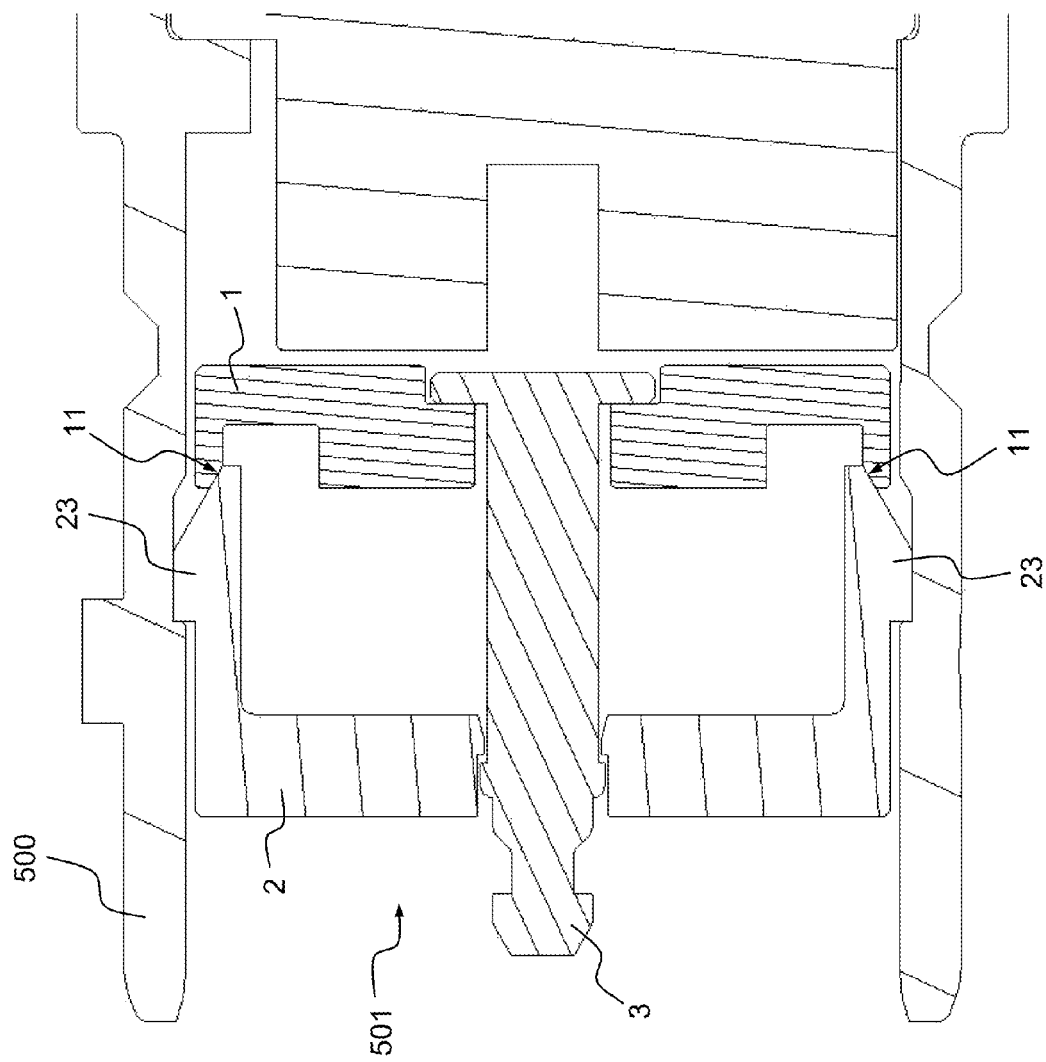
FIG. 8 is a schematic illustration of a socket holder mounted in a connector.

By way of illustration, FIG. 8 shows a connector 500 in which a socket holder support 501 according to the invention is mounted. The socket holder 501 corresponds, for example, to that of the first embodiment described (push-pull), with parts 1 and 2 and the pin 3 for extraction (see FIG. 2, for example).

Clearly, all the various embodiments of socket holder supports described in the present application may be mounted in the connector 500, with the appropriate adaptations and modifications of the connector to suit the locking means (push-pull, bayonet, clips or bosses).

The embodiments described are provided by way of illustrative examples and are not to be considered as limiting. Variations are entirely possible within the context of the present invention and the claimed protection. The number of sockets may be varied from that mentioned in the given examples (by being more or fewer than four), and the same applies to the bosses, etc.

As mentioned above, the various parts forming the support may be manufactured from any appropriate material, for example synthetic material.

The different embodiments and variants illustrated may also be combined with one another, according to circumstances and the choices made.

The invention claimed is:

1. A supporting device for alignment sockets in a connector, comprising:
   a push locking device having strips and a first central hole, each strip having a first chamfer and a shoulder, the hole having an engagement ledge;
   a socket holder having a second central hole, the holder forming second chamfers, each second chamfer configured to engage with a respective first chamfer of a respective strip of the push locking device; and
   a pin having a collar, the pin passing through the second central hole of the holder and the first central hole of the push locking device, such that the collar of the pin engages with the engagement ledge of the push locking device,
   wherein each shoulder of the strip of the push locking device is configured to engage with a corresponding shoulder of the connector, and each strip of the push locking device disengages from the corresponding shoulder of the connector by moving the pin in a direction towards the push locking device such that the collar of the pin moves away from the engagement ledge of the push locking device.

2. The supporting device according to claim 1, wherein the first chamfer of each strip of the push-locking device, and the second chamfer of each opening of the holder are configured to bend the strips inwardly upon the pressing of the pin, such that the strips of the push locking device disengage from the corresponding shoulder of the connector.

3. The supporting device according to claim 1, wherein the collar of the pin and the engagement ledge of the push locking device are configured such that, once engaged, the pin is secured from removal in a direction towards the holder.

4. The supporting device according to claim 1, wherein upon disengagement of the strips of the push locking device from the corresponding shoulder of the connector, the supporting device is removable from the connector.

5. The supporting device according to claim 1, wherein the pin and the second central hole are configured as a bayonet lock, the collar of the pin formed by a knob protruding laterally from the pin, and the engagement ledge of the push locking device formed as a slot for engaging with the knob.

6. The supporting device according to claim 1, wherein the first chamfer of each strip of the push locking device is formed by a curved surface.

7. The supporting device according to claim 1, wherein a length of the alignment sockets are such that, when the collar of the pin engages with the engagement ledge of the push locking device, the holder can be further moved towards the push locking device for disengagement from the connector.

8. The supporting device for alignment sockets in a connector, comprising:
- a push locking device having strips and a first central hole, each strip having a first bending surface and a first engagement means, the hole having a first locking means;
- a socket holder having second bending surfaces and a second central hole, each second bending surface configured to engage with the first bending surface of a corresponding strip of the push locking device; and
- a pin having a second locking means, the pin passing through the second central hole of the holder and the first central hole of the push locking device, such that the second locking means of the pin engages with the first locking means of the push locking device,
- wherein each first engagement means of the strip of the push locking device engages with a corresponding second engagement means of the connector, and strips of the push locking device disengage from the corresponding second engagement means of the connector by moving the pin in a direction towards the push locking device such that the pin disengages from a surface of the first locking means of the push locking device.

9. The supporting device according to claim 8, wherein the first bending surface of each strip of the push-locking device, and each second bending surface of the holder are configured to bend the strips inwardly upon the pressing of the pin, such that the strips of the push locking device disengage from the second engagement means of the connector.

10. The supporting device according to claim 9, wherein upon disengagement of the strips of the push locking device from the corresponding second engagement means of the connector, the supporting device can be removed from the connector.

11. The supporting device according to claim 9, wherein the pin and the second central hole are configured as a bayonet lock, the second locking means of the pin formed by a knob protruding laterally from the pin, and the first locking means of the push locking device formed as a slot for engaging with the knob.

12. The supporting device according to claim 9, wherein the first first bending surface is curved.

13. The supporting device according to claim 9, wherein a length of the alignment sockets are such that, when the second locking means of the pin engages with the first locking means of the push locking device, the holder can be further moved towards the push locking device for disengagement from the connector.

14. The supporting device according to claim 9, wherein the first and second locking means form a snap-in mechanism.

15. The supporting device according to claim 8, wherein the second locking means of the pin and first locking means of the push locking device are configured such that, once engaged, the pin is secured from removal in a direction towards the holder.

16. A connector having a socket holder and a connector shoulder surrounding the socket holder, the socket holder comprising:
- a locking device having a first hole and a side wall;
- a holder configured to carry alignment sockets, the side wall of the locking device bendably engaging with the holder; and
- a pin passing through the holder and the first hole of the locking device, the pin and the holder being movable relative to the locking device;
- wherein in a first position of the pin relative to the locking device, the side wall of the locking device is engaged with the connector shoulder, and in a second position of pin relative to the locking device, in which the pin is moved forward from the first position towards the locking device, the side wall of the locking device is disengaged from the connector shoulder such that the connector shoulder can be removed from the socket holder.

17. The connector according to claim 16, wherein in the second position, the holder is configured such that the side wall of the locking device is bent by the holder to disengage from the connector shoulder.

\* \* \* \* \*